United States Patent
Monteiro et al.

(10) Patent No.: US 10,401,527 B2
(45) Date of Patent: *Sep. 3, 2019

(54) DEVICES FOR DETECTING CHEMICALS

(71) Applicant: Baker Hughes, a GE company, LLC, Houston, TX (US)

(72) Inventors: Othon R. Monteiro, Houston, TX (US); Anusha Chilukuri, Katy, TX (US); Sankaran Murugesan, Katy, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,925

(22) Filed: Dec. 27, 2017

(65) Prior Publication Data

US 2018/0120469 A1    May 3, 2018

Related U.S. Application Data

(63) Continuation of application No. 14/296,802, filed on Jun. 5, 2014, now Pat. No. 9,857,498.

(51) Int. Cl.
*G01V 3/26* (2006.01)
*G01V 3/38* (2006.01)
(Continued)

(52) U.S. Cl.
CPC ............. *G01V 3/26* (2013.01); *E21B 47/10* (2013.01); *G01V 3/38* (2013.01); *E21B 2049/085* (2013.01); *Y10T 29/49828* (2015.01)

(58) Field of Classification Search
CPC .. G01V 3/26; G01V 3/38; E21B 47/10; E21B 2049/085
See application file for complete search history.

(56) References Cited

U.S. PATENT DOCUMENTS 3,045,198 A * 7/1962 Dolan .................. G01M 3/045
                                                        324/71.5
3,181,098 A    4/1965 Richards
(Continued)

FOREIGN PATENT DOCUMENTS

EP    0869353    5/2004

OTHER PUBLICATIONS

Feller et al., "Selectivity of Chemoresistive Sensors Made of Chemically Functionalized Carbon Nanotube Random Networks for Volatile Organic Compounds (VOC)," Jan. 2014, Chemosenosrs 204, 2, 26-40.
(Continued)

*Primary Examiner* — John Fitzgerald
(74) *Attorney, Agent, or Firm* — TraskBritt (57) ABSTRACT

Devices and methods for detecting chemicals are disclosed. A device configured for use in a wellbore includes a sensor including a quantum tunneling composite (QTC) material configured to exhibit a change in electrical resistance responsive to the sensor contacting a target chemical. The sensor includes electrical resistance measuring circuitry operably coupled to the QTC material and configured to measure the electrical resistance of the QTC material and output a sensor signal indicating the electrical resistance. A method comprises deploying the sensor into the wellbore, measuring the electrical resistance of the QTC material, and determining the presence of the target chemical responsive to detecting changes in the electrical resistance of the QTC material. Another method includes selecting at least one of the QTC material and an active material to interact with a target wellbore chemical to change the electrical resistance of the QTC material.

20 Claims, 7 Drawing Sheets

(51) Int. Cl.
*E21B 47/10* (2012.01)
*E21B 49/08* (2006.01)

(56) References Cited

U.S. PATENT DOCUMENTS

| | | | | |
|---|---|---|---|---|
| 3,820,958 | A | * | 6/1974 | Cheng .................... G01N 27/12 338/34 |
| 4,098,121 | A | * | 7/1978 | Captain .................. G01N 19/10 73/335.11 |
| 4,313,338 | A | * | 2/1982 | Abe ........................ G01N 27/12 338/34 |
| 4,631,952 | A | * | 12/1986 | Donaghey ............. G01M 3/045 338/34 |
| 4,674,320 | A | | 6/1987 | Hirschfeld |
| 4,812,014 | A | | 3/1989 | Sawano et al. |
| 4,900,405 | A | | 2/1990 | Otagawa et al. |
| 5,105,247 | A | * | 4/1992 | Cavanaugh ......... H01L 29/7391 257/105 |
| 5,121,627 | A | * | 6/1992 | D'Aoust .................. G01N 7/10 73/19.05 |
| 5,163,521 | A | | 11/1992 | Pustanyk et al. |
| 5,191,784 | A | * | 3/1993 | Jelley .................... B82Y 20/00 250/338.4 |
| 5,317,897 | A | * | 6/1994 | Jelley .................... B82Y 20/00 257/21 |
| 5,430,815 | A | | 7/1995 | Shen et al. |
| 5,512,882 | A | * | 4/1996 | Stetter .................. G01N 27/126 340/632 |
| 5,679,888 | A | * | 10/1997 | Tohda .................... B82Y 35/00 374/E7.03 |
| 5,744,794 | A | | 4/1998 | Michie et al. |
| 5,969,638 | A | | 10/1999 | Chin |
| 6,004,494 | A | | 12/1999 | Debe |
| 6,586,723 | B2 | | 7/2003 | Moran et al. |
| 6,594,602 | B1 | | 7/2003 | Schultz |
| 6,597,821 | B1 | | 7/2003 | Bohnert et al. |
| 6,705,152 | B2 | | 3/2004 | Routkevitch et al. |
| 6,965,708 | B2 | | 11/2005 | Luo et al. |
| 7,093,499 | B2 | | 8/2006 | Baudendistel |
| 7,186,356 | B2 | | 3/2007 | Lussey et al. |
| 7,223,367 | B1 | | 5/2007 | Vossmeyer et al. |
| 7,320,252 | B2 | | 1/2008 | Jones |
| 7,513,147 | B2 | | 4/2009 | Yogeswaren |
| 7,631,697 | B2 | * | 12/2009 | Bhavsar ................ B82Y 15/00 166/179 |
| 7,909,096 | B2 | | 3/2011 | Clark et al. |
| 8,884,769 | B2 | | 11/2014 | Novak |
| 8,893,547 | B2 | | 11/2014 | DiFoggio et al. |
| 8,907,677 | B2 | | 12/2014 | Kaya |
| 9,116,057 | B2 | * | 8/2015 | Brown .................. G01L 19/145 |
| 9,857,498 | B2 | * | 1/2018 | Monteiro ................ E21B 47/10 |
| 2002/0117659 | A1 | | 8/2002 | Lieber et al. |
| 2004/0045350 | A1 | * | 3/2004 | Jones ...................... E21B 43/38 73/152.23 |
| 2004/0159149 | A1 | | 8/2004 | Williams et al. |
| 2004/0217331 | A1 | | 11/2004 | Lussey et al. |
| 2004/0263312 | A1 | | 12/2004 | Johnson et al. |
| 2005/0274199 | A1 | | 12/2005 | Jones |
| 2007/0052516 | A1 | | 3/2007 | Hines et al. |
| 2007/0107494 | A1 | * | 5/2007 | Rezgui ................ G01L 19/0046 73/29.03 |
| 2007/0114138 | A1 | | 5/2007 | Krasteva et al. |
| 2007/0252035 | A1 | | 11/2007 | Hubbard |
| 2008/0125335 | A1 | | 5/2008 | Bhaysar |
| 2008/0245675 | A1 | | 10/2008 | Joseph et al. |
| 2009/0166037 | A1 | | 7/2009 | Sroka |
| 2010/0011853 | A1 | * | 1/2010 | Anthony ................ E21B 47/011 73/152.02 |
| 2010/0147064 | A1 | * | 6/2010 | DiFoggio .............. E21B 47/011 73/152.18 |
| 2010/0147065 | A1 | * | 6/2010 | Tan ........................ E21B 47/10 73/152.24 |
| 2010/0242615 | A1 | | 9/2010 | Sato et al. |
| 2010/0273665 | A1 | | 10/2010 | Haick et al. |
| 2012/0019258 | A1 | | 1/2012 | Kaya |
| 2012/0055243 | A1 | | 3/2012 | DiFoggio et al. |
| 2012/0256750 | A1 | | 10/2012 | Novak |
| 2013/0320467 | A1 | | 12/2013 | Buchanan et al. |
| 2014/0076063 | A1 | | 3/2014 | Lisseman et al. |
| 2014/0238141 | A1 | * | 8/2014 | Brown .................. G01L 19/145 73/706 |
| 2014/0245810 | A1 | * | 9/2014 | Stirling ................ B81C 99/005 73/1.79 |
| 2015/0355366 | A1 | | 12/2015 | Monteiro et al. |

OTHER PUBLICATIONS

Graham et al., Metal-Polymer Composite Sensors for Volatile Organic Compounds: Part 2. Stand Alone Chimi-Resistors, Sensors and Actuators B, vol. 177 (2013), pp. 507-514.
Hands et al., Metal-Polymer Composite Sensors for Volatile Organic Compounds: Part 1. Flow-Through Chemi-Resistors, Sensors and Actuators B, vol. 162 (2012), pp. 400-408.
ICGC "What is a geothermal reservoir? Types of geothermal reservoirs," web document, Aug. 2014, 2 pages.
International Search Report for International Application No. PCT/US2015/034250, dated Jun. 5, 2014, 3 pages.
International Written Opinion for International Application No. PCT/US2015/034250, dated Aug. 21, 2015, 11 pages.
Prabhakar et al, Gas and Vapor Sorption and Permeation in Poly(2,2,4-trifluoro-5-trifluoromethoxy-1,3-dioxole-co-tetrafluoroethylene); Manuscript, Sep. 11, 2004, vol. 37, No. 20, pp. 7688-7697, American Chemical Society.
PetroWiki, "Reservoir pressure and temperature," web document, 2015, 4 pages.
Transduce. Merriam-Webster. Available at <http://www.merriam-webster.com/dictionary/transducing>, accessed Mar. 22, 2019, 1 page.
Affinity. Merriam-Webster. Available at <http://www.merriam-webster.com/dictionary/affinity>, accessed Mar. 22, 2019, 1 page.

* cited by examiner

DEVICES FOR DETECTING CHEMICALS

CROSS-REFERENCE TO RELATED APPLICATION

This application is a continuation of U.S. patent application Ser. No. 14/296,802, filed Jun. 5, 2014, now U.S. Pat. No. 9,857,498 issued on Jan. 2, 2018, the disclosure of which is hereby incorporated herein in its entirety by this reference.

TECHNICAL FIELD

The present disclosure relates to sensing of all or a portion of chemical compositions of materials. More specifically, the present disclosure relates to sensing of all or a portion of chemical compositions of materials in wellbores using quantum tunneling composite materials.

BACKGROUND

In the oil and gas industry, as well as in the mining, water, and geothermal industries, samples are brought to the surface during drilling of wellbores to determine what substances may be found in a wellbore. For example, mud including chemicals, rock, and soil from the wellbore may be brought to the surface and tested in a lab. Also, samples of rock formations from the wellbore may be brought to the surface (e.g., sidewall coring, full coring, etc.) for inspection and testing.

Knowing the chemical composition of the materials in a wellbore may be helpful in determining whether to keep drilling a wellbore, or in determining whether a wellbore that is in use remains suitable for its intended purpose. For example, it may be helpful to know whether certain hydrocarbons associated with oil and gas are present in a wellbore to determine whether to keep drilling for oil or gas.

Substantial investments in time, effort and money may routinely be made to bring material from a wellbore to the surface for inspection and testing. For example, wellbore drilling may often be halted in order to deploy a specialized bit configured for obtaining a sample of a rock from the wellbore (i.e., full coring). Such investments continue, however, because the information obtained thereby may be of sufficient value to justify the investment.

BRIEF SUMMARY

In some embodiments, the present disclosure comprises a method of sensing a target chemical. The method includes deploying a sensor into a wellbore. The sensor includes a quantum tunneling composite material configured to exhibit a change in an electrical resistance of the quantum tunneling composite material responsive to the presence of a target chemical proximate the sensor. The method also includes measuring the electrical resistance of the quantum tunneling composite material, and determining the presence of the target chemical in the wellbore responsive to detecting the change in the electrical resistance of the quantum tunneling composite material.

In some embodiments, the present disclosure comprises a device for use in a wellbore. The device includes a body, and a sensor carried by the body. The sensor includes a quantum tunneling composite material and electrical resistance measuring circuitry operably coupled to the quantum tunneling composite material. The quantum tunneling composite material is configured to exhibit a change in an electrical resistance of the quantum tunneling composite material responsive to the sensor contacting a target chemical in a wellbore. The electrical resistance measuring circuitry is configured to measure the electrical resistance of the quantum tunneling composite material and output a sensor signal indicating the electrical resistance.

In some embodiments, the present disclosure comprises a method of manufacturing a device configured for use in a wellbore. The method includes contacting a quantum tunneling composite material comprising conductive particles distributed in an insulating material with electrodes. The method also includes operably coupling electrical resistance measuring circuitry configured to measure an electrical resistance of the quantum tunneling composite material to the electrodes. The method further includes selecting at least one of the quantum tunneling composite material and an active material at least partially surrounding the quantum tunneling composite material to interact with a target wellbore chemical to change the electrical resistance of the quantum tunneling composite material responsive to the presence of a target chemical proximate the quantum tunneling composite material.

DETAILED DESCRIPTION

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions, rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the present disclosure. Accordingly, the dimensions of the various features may be arbitrarily expanded or reduced for clarity. In addition, some of the drawings may be simplified for clarity.

Information and signals described herein may be represented using any of a variety of different technologies and techniques. For example, data, instructions, commands, information, signals, bits, symbols, and chips that may be referenced throughout the description may be represented by or embodied in voltages, currents, electromagnetic waves, magnetic fields or particles, optical fields or particles, or any combination thereof. Some drawings may illustrate signals as a single signal for clarity of presentation and description. It should be understood by a person of ordinary skill in the art that a signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the term "quantum tunneling composite" (QTC) refers to a composite that includes conductive particles dispersed in an insulating material. For example, a QTC may include spiky metal particles including nano-scale needle-like features, the spiky metal particles dispersed in an insulating polymer matrix. QTC™ composites sold by Peratech Holdco Limited are commercially available. These QTC composites sold by Peratech Holdco Limited include spiky nickel particles dispersed in a silicone elastomer matrix. The silicone elastomer may withstand temperatures as high as 400° Celsius. Consequently, QTC composites including silicone elastomer or other polymers may withstand downhole temperatures, which are typically not higher than about 300° Celsius. For example, in U.S. Patent Publication No. 2012/0055243, the entire disclosure of which is hereby incorporated herein by this reference, QTC elements have been proposed to be used as transducers for acoustic sensing in downhole applications.

Electrical resistance of QTCs has been observed to vary exponentially as a function of the distance between the conductive particles. Accordingly, QTCs may be used to detect pressure on the QTCs, or any other phenomena that results in compression or expansion of the QTCs, which, in turn, results in the conductive particles drawing closer together or farther apart, respectively. QTCs have also been observed to exhibit high electrical resistance (e.g., greater than about $10^{12}$ ohms) in an uncompressed state, and extremely low electrical resistance (e.g., less than 1 ohm) in a compressed state. In other words, QTCs may essentially be electrical insulators in an uncompressed state, and conductors in a compressed state (e.g., exhibiting a drop in electrical resistance of about 12 orders of magnitude).

Embodiments of the present disclosure include apparatuses, systems, and methods for chemical sensing. It should be noted that while the utility and application of the various embodiments of the present disclosure are described herein with reference to sensing of chemical compositions in wellbores, embodiments of the present disclosure may also be implemented in any environment where such sensing would be helpful or desirable.

Figure 1A:
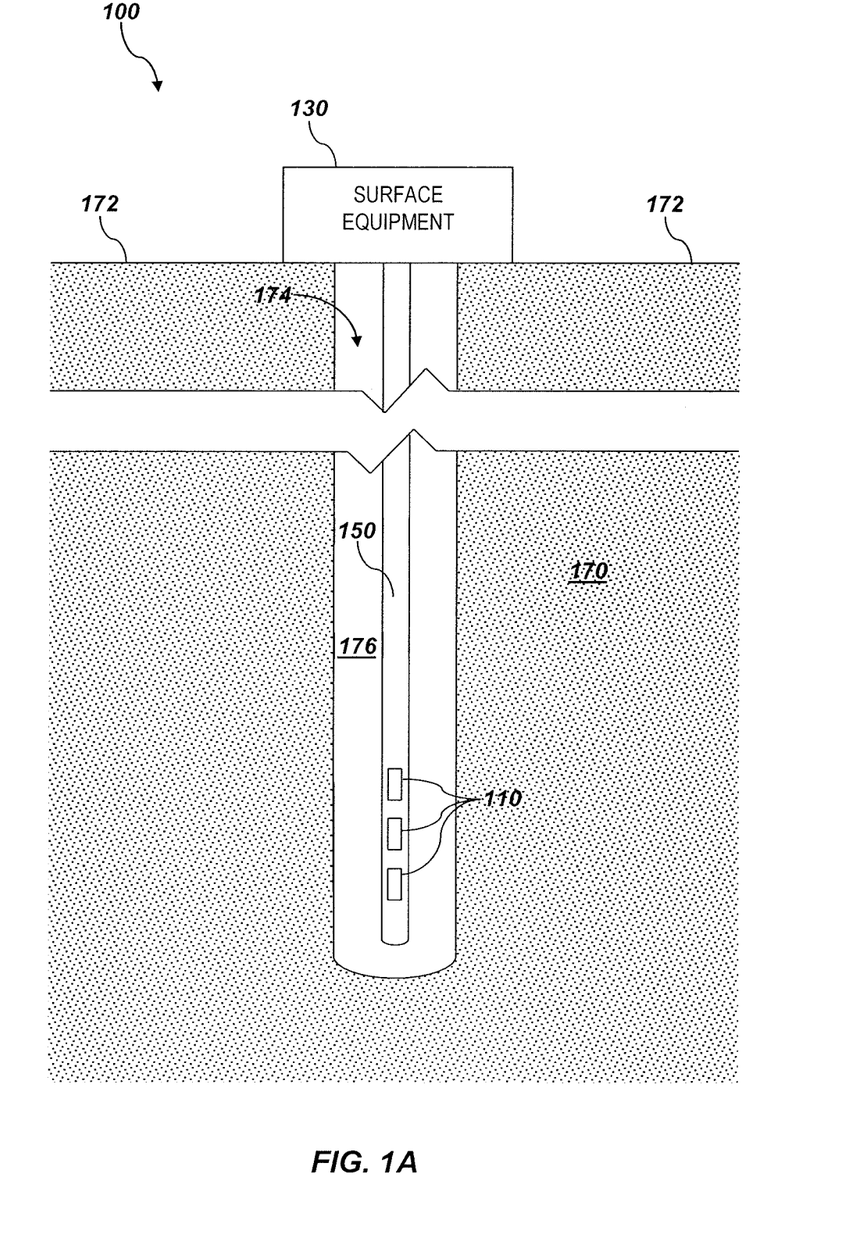
FIG. 1A is a simplified schematic illustration of a wellbore device that includes a chemical sensing system.
Figure 1B:
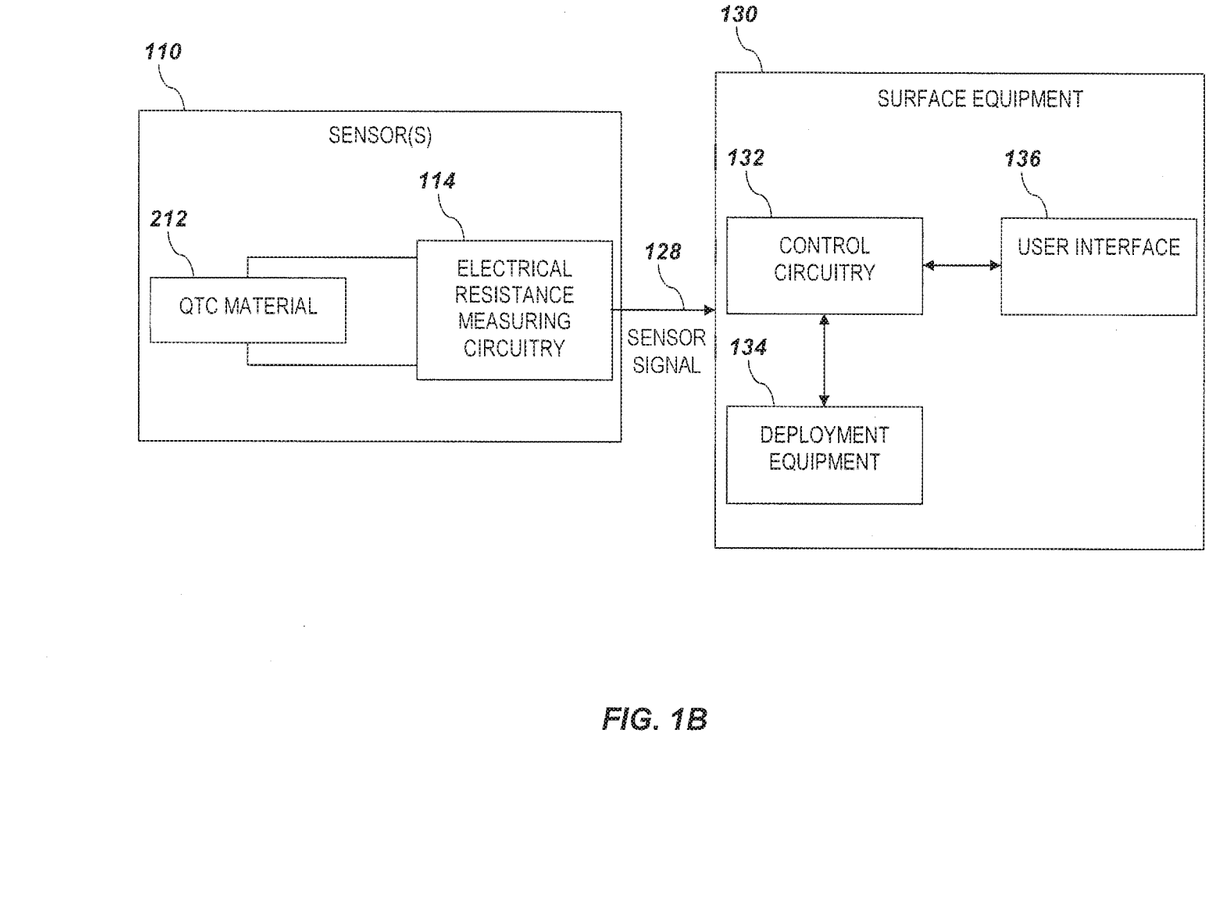
FIG. 1B is a simplified block diagram of the chemical sensing system of FIG. 1A.

FIGS. 1A and 1B illustrate a wellbore device that includes a chemical sensing system 100.

FIG. 1A is a simplified semi-schematic illustration of a wellbore device that includes a chemical sensing system 100. FIG. 1B is a simplified block diagram of the chemical sensing system 100. Referring to FIGS. 1A and 1B together, the chemical sensing system 100 may be configured to enable sensing (e.g., detection) of chemicals 176 in a wellbore 174 without removing material from the wellbore 174, and without using laboratory equipment and tools. The chemical sensing system 100 may include a body 150 and at least one sensor 110 (sometimes referred to herein simply as "sensor" 110) carried by the body 150, and surface equipment 130. The surface equipment 130 may be configured to control the deployment of the body 150 into the wellbore 174, receive sensor signals 128 from the sensor 110, and present sensor information from the sensor signals 128 to a user of the chemical sensing system 100.

The sensor 110 may be configured to produce the sensor signals 128 including the sensor information. The sensor 110 may be configured to interact with (i.e., respond in some way responsive to the presence of) a target chemical or chemicals (hereinafter referred to simply as "target chemical") proximate the sensor 110 to cause a QTC material 212 of the sensor 110 to exhibit a change in electrical resistance. Accordingly, if the chemicals 176 in the wellbore 174 include the target chemical with which the sensor 110 is configured to interact, the electrical resistance of the QTC material 212 of the sensor 110 may change responsive to the sensor contacting the chemicals 176. By way of non-limiting example, the target chemical may include one or more of hydrogen sulfide ($H_2S$), carbon dioxide ($CO_2$), hydrocarbons of targeted molecular weights, and other chemicals.

The sensor 110 may also include electrical resistance measuring circuitry 114 operably coupled to the QTC material 212. The electrical resistance measuring circuitry 114 may be configured to measure the electrical resistance of the QTC material 212, and transmit the changes in electrical resistance of the QTC material 212 to the surface equipment 130 as sensor signals. By way of non-limiting example, the electrical resistance measuring circuitry 114 may include any of a Wheatstone bridge, a voltage divider circuit, and any other circuit that may detect electrical resistance. The surface equipment 130 may be configured to, responsive to the sensor signals, indicate the change in resistance, or the presence of the target chemical, to a user of the chemical sensing system 100.

In some embodiments, the surface equipment 130 may include a platform or rig at a surface 172 of a formation 170 through which the wellbore 174 extends. The surface equipment 130 may include control circuitry 132 operably coupled to deployment equipment 134 and a user interface 136. In some embodiments, the control circuitry 132 may be configured to process the sensor signals 128 provided by the sensor 110. For example, the control circuitry 132 may be configured to compare a measured electrical resistance of the QTC material 212 to an expected decreasing electrical resistance profile due to increasing hydrostatic pressure in the wellbore 174 as the sensor 110 descends into the wellbore 174 to compensate for such pressure-induced resistance changes.

In some embodiments, the electrical resistance of the QTC material 212 may decrease relative to an expected, pressure-induced changing electrical resistance profile responsive to the sensor 110 contacting the target chemical. For simplicity, such decreases relative to the expected changing electrical resistance profile may be referred to herein as "decreases in electrical resistance," or "decreasing electrical resistance." In other embodiments, the electrical resistance of the QTC material 212 may increase relative to the expected, pressure-induced changing electrical resistance profile responsive to the sensor 110 contacting the target chemical. For simplicity, such increases relative to the expected changing electrical resistance profile may be referred to herein simply as "increases in electrical resistance," or "increasing electrical resistance." Likewise, general reference to changes in electrical resistance of the QTC material 212 responsive to the sensor 110 contacting the target material should be understood as relative to the expected changing electrical resistance profile, if any.

In some embodiments, the control circuitry 132 may also be configured to provide the user access to the sensor information from the sensor signals 128 through a user interface 136. The control circuitry 132 and the user interface 136 may further be configured to enable the user to control the deployment equipment 134. The deployment equipment 134 may be configured to deploy and retract the body 150 into the wellbore 174.

In some embodiments, the control circuitry 132 may be configured to store the sensor information from the sensor signals 128 while the sensor 110 is deployed in the wellbore 174 to enable a user to analyze the sensor information after the sensor 110 is removed from the wellbore 174. Also, in some embodiments, the sensor 110 may not be configured to communicate with the control circuitry 132. For example, the body 150 may be configured to also carry a storage device (not shown) to store the sensor information provided by the sensor 110, and the user may access the sensor information stored in the storage device (e.g., with the surface equipment 130 or other computing device) after the sensor 110 has been removed from the wellbore 174.

The body 150 may include any device that may be extended into the wellbore 174. For example, the body 150 may include an extending member. In some embodiments, the body 150 may include a drilling assembly that is conveyed into the wellbore 174 by a jointed-tubular or a coiled-tubing. Accordingly, the chemical sensing system 100 may be configured to sense chemicals while drilling. In some embodiments, the body 150 may include an electrical armored cable (sometimes referred to herein as a "wireline"), a slickline, coiled tubing, etc. Accordingly, the chemical sensing system 100 may be configured to sense chemicals during a wireline operation. In some embodiments, the sensor 110 may be deployed with equipment used for completions and production in the wellbore. Accordingly, the chemical sensing system 100 may be configured to sense chemicals during the phases of completion and production of the wellbore.

In some embodiments, the body 150 itself may be configured to relay electrical communication between the sensor 110 and the surface equipment 130. The telemetry for communication between the sensor 110 and the surface equipment 130, however, may include any suitable telemetry system, including, but not limited to, mud pulse telemetry, radio frequency signal telemetry, electromagnetic telemetry, acoustic signal telemetry, and wired-pipe telemetry, including electrical conductors or optical fibers.

In operation, the user interface 136 may receive commands from a user to deploy the body 150. In response, the control circuitry 132 may cause the deployment equipment 134 to deploy the body 150 into the wellbore 174. As the sensor 110 travels into the wellbore 174 with the body 150, pressure may be applied to the sensor 110 as a result of the depth of the sensor 110. The increased pressure may cause conductive particles dispersed in the QTC material 212 of the sensor 110 to draw closer together. As a result, the pressure may cause the electrical resistance of the QTC material 212 to decrease gradually as the sensor 110 travels deeper into the wellbore 174.

As the sensor 110 descends into the wellbore 174, the sensor 110 may come into contact with various fluids (e.g., gases, liquids, and combinations thereof). As used herein, the term "fluids" encompasses solids suspended therein. If the sensor 110 comes into contact with the target chemical in one or more of the various fluids, the electrical resistance of the QTC material 212 in the sensor 110 may change (e.g., deviate from the expected electrical resistance profile). By way of non-limiting example, the QTC material 212 may absorb the target chemical and swell, which may cause the electrical resistance of the QTC material 212 to increase. The electrical resistance measuring circuitry 114 may detect the change in electrical resistance, and provide the sensor signals 128 indicating the change in electrical resistance to the surface equipment 130. The control circuitry 132 may cause the user interface 136 to provide the sensor information to the user of the chemical sensing system 100.

Figure 2:
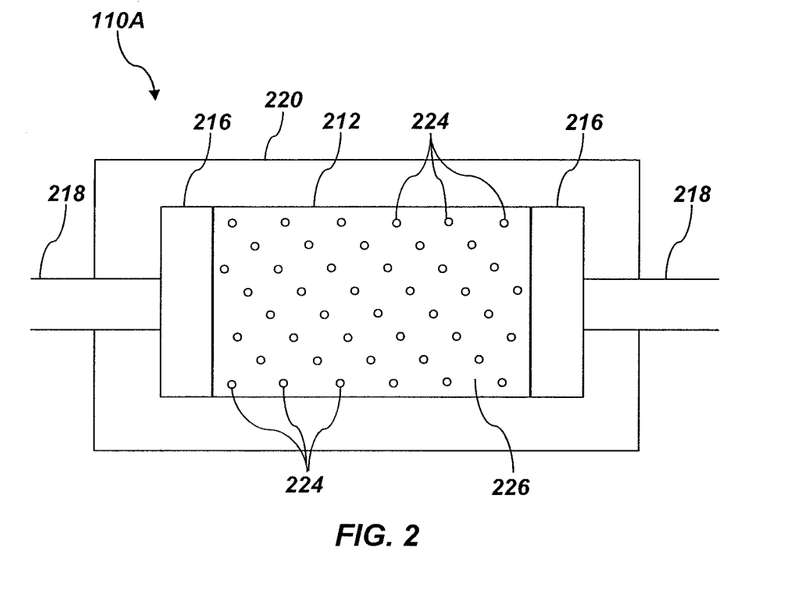
FIG. 2 is a simplified cross-sectional view of a portion of a sensor.

FIG. 2 is a simplified cross-sectional view of a portion of a sensor 110A. The sensor 110A may include a QTC material 212, and conductive electrodes 216 operably coupled to opposing sides of the QTC material 212. The QTC material 212 may include conductive particles 224 distributed in an electrically insulating material 226. Conductors 218 operably coupled to the conductive electrodes 216 may enable electrical communication between the QTC material 212 and the electrical resistance measuring circuitry 114 (FIG. 1B).

Non-limiting examples of polymers that may be used for the insulating material 226 include any of a polysiloxane (silicone), perfluoroelastomer (FFKM), nitrile, hydrogenated nitrile butadiene rubber (HNBR), fluoroelastomer (FKM), base resistant fluoroelastomer (FEPM), ethylene propylene diene monomer, (EPDM), polyurethane, polytetrafluoroethylene (TEFLON®), polyetheretherketone (PEEK), polyphenylene sulfide (RYTON®), glass fiber epoxy, carbon fiber epoxy, phenolic carbon fiber, glass fiber PEEK, carbon fiber PEEK, poly-oxydiphenylene-pyromellitimide (KAPTON®), and others.

The sensor 110A may also include an active material 220 at least partially enclosing the QTC material 212. The active material 220 may be selected to interact with the target chemical to change the electrical resistance of the QTC material 212 responsive to contact with the target chemical. For example, the active material 220 may be configured (such term as used herein including both physical structure and compositional formulation) to either apply pressure to the QTC material 212, or to reduce pressure to the QTC material 212 responsive to interacting with the target chemical. In some embodiments, actuators (not shown) may be provided between the active material 220 and the QTC material 212 to concentrate forces applied to the QTC material 212 by the active material 220.

In some embodiments, interactions between the active material 220 and the target chemical may include chemical reactions between the active material 220 and the target chemical. For example, the active material 220 may react with the target chemical to contract on the QTC material 212, or retract from the QTC material 212. Chemical reactions may include any of synthesis reactions, decomposition reactions, and replacement reactions. By way of non-limiting example, the active material 220 may be selected to react chemically with the target chemical to contract on the QTC material 212. As a specific, non-limiting example, the active material 220 may comprise metal oxides or mixed metal oxides such as zinc oxide (ZnO) or tin oxide ($SnO_2$) configured to react with hydrogen sulfide ($H_2S$) to form metal sulfides (e.g., zinc sulfide (ZnS) or tin sulfide ($SnS_2$), respectively). The reaction of the zinc oxide (ZnO) or the tin oxide ($SnO_2$) with the hydrogen sulfide ($H_2S$) may cause the active material 220 to contract on the QTC material 212. As the active material 220 contracts on the QTC material 212, the conductive particles 224 in the QTC material 212 may be forced closer together, and the electrical resistance of the QTC material 212 may decrease. Accordingly, the decrease in the electrical resistance may be sensed to detect the presence of the hydrogen sulfide ($H_2S$).

Also by way of non-limiting example, the active material 220 may be selected to react chemically with the target chemical to relieve the QTC material 212 from pressure responsive to contact with the target chemical. For example, the active material 220 may be configured to apply pressure to the QTC material 212 by default. Responsive to contact with the specific chemical or chemicals, the active material 220 may be configured to release the pressure on the QTC material 212. The active material may include ion-selective polymers or Ionophore-doped sensing membranes such as NAFION® (polytetra fluoro ethylene), PVC with crown ethers, Tridodecylmethylammonium-dinonylnapthalene sulfonate (TDMA-DNNS) and plasticized polymers with polar and non-polar trapping agents such as poly vinyl chloride (PVC) with bis(2-ethylhexyl) sebacate (DOS, non-polar) or ortho-nitrophenyl octylether (o-NPOE, polar). Accordingly, hydrocarbon and water may be selectively detected separately.

In some embodiments, the active material 220 may be configured to physically interact with a specific chemical or chemicals to change the electrical resistance of the QTC material 212. By way of non-limiting example, the active material 220 may be configured to apply pressure to the QTC material 212 responsive to contact with the specific chemical or chemicals. As a specific, non-limiting example, the active material 220 may be configured to swell (e.g., by absorbing the specific chemical or chemicals) responsive to contact with the specific chemical or chemicals. The swelling of the active material 220 may cause the active material 220 to press against the QTC material 212, thereby forcing the conductive particles closer together, and decreasing the electrical resistance of the QTC material 212. The decreased electrical resistance may be sensed to detect the presence of the target chemical.

Also by way of non-limiting example, the active material 220 may be configured to physically interact with the target chemical to relieve pressure on the QTC material 212. The active material 220 may be configured to apply pressure to the QTC material 212 by default, and release the pressure responsive to contact with the chemical or chemicals. As a specific, non-limiting example, the active material 220 may include a material that is dissolved by the target chemical. Responsive to contacting the target chemical, the active material 220 may dissolve, and the pressure that was placed on the QTC material 212 by the active material 220 may be relieved. With the pressure relieved, the conductive particles 224 may spread further apart, and the electrical resistance of the QTC material 212 may increase. The increase in electrical resistance may be sensed to detect the presence of the target chemical.

Regardless of whether the interactions between the active material 220 and the target chemical are chemical or physical interactions, and whether the interactions increase or decrease a force on the QTC material 212, the interactions may cause a change in the electrical resistance of the QTC material 212. The change in electrical resistance may be sensed, and the presence of the target chemical may be detected.

In some embodiments, the change in electrical resistance of a QTC material 212 may occur responsive to interactions between the QTC material 212 and the target chemical, as will be discussed below with reference to FIG. 3.

Figure 3:
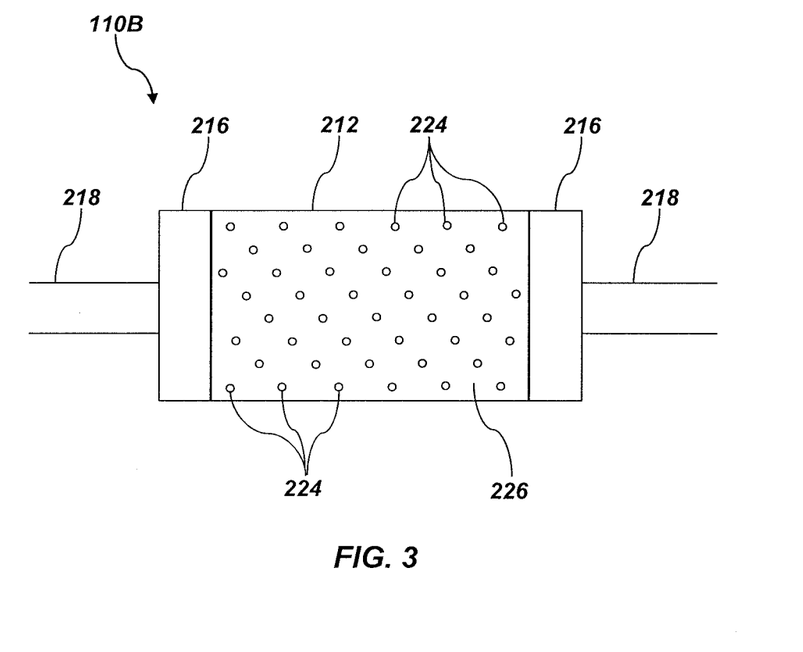
FIG. 3 is a simplified cross-sectional view of a portion of another sensor.

FIG. 3 is a simplified cross-sectional view of a portion of another sensor 110B. Similar to the sensor 110A discussed above with reference to FIG. 2, the sensor 110B may include a QTC material 212 operably coupled between conductive electrodes 216. The QTC material may include conductive particles 224 distributed in an electrically insulating material 226. Conductors 218 operably coupled to the conductive electrodes 216 may enable electrical communication between the QTC material 212 and the electrical resistance measuring circuitry 114 (FIG. 1B). At least one of the electrically insulating material 226 and the conductive particles 224 may be selected to interact with the target chemical to change the electrical resistance of the QTC material 212 responsive to contacting the target chemical.

In some embodiments, the conductive particles 224 may be selected to interact with the target chemical to decrease the conductivity of the conductive particles (e.g., through a chemical reaction between the conductive particles). A decrease in the conductivity of the conductive particles 224 may result in an increase in resistance of the QTC material 212, or in failure of the QTC material 212 to function as a QTC material (e.g., quantum tunneling may not occur between nonconductive particles). In such embodiments, the QTC material 212 may include a thin film of the QTC material 212 to enable the target chemical to ingress through the thickness of the QTC material 212, and interact with most or all of the conductive particles 224 in the QTC material 212. By way of non-limiting example, silver (Ag) may be selected for the conductive particles 224 to chemically react with hydrogen sulfide ($H_2S$) to form silver sulfide ($Ag_2S$), which is non-conductive. Responsive to a portion of the conductive particles 224 contacting the target chemical, the portion of the conductive particles 224 may react with the hydrogen sulfide ($H_2S$) to form silver sulfide ($AG_2S$). As a result, a decreased number of the conductive particles 224 may remain conductive, and the electrical resistance of the QTC material 212 may increase. The increase of the electrical resistance may be sensed to detect the presence of the target chemical.

In some embodiments, the electrically insulating material 226 may be selected to interact with the target chemical to change the conductivity of the QTC material 212 (e.g., through a chemical or physical interaction between the electrically insulating material 226 and the target chemical). By way of non-limiting example, the electrically insulating material 226 may be selected to absorb the target chemical, and therefore swell responsive to contacting the target chemical. The swelling of the electrically insulating material 226 may cause the electrically conductive particles 224 to spread further apart from each other, which may result in an increase of the electrical resistance of the QTC material 212.

Hybrids of the sensors 110A, 110B discussed above with reference to FIGS. 2 and 3 are also contemplated. In other words, the electrical resistance of the QTC material 212 may be configured to change responsive to interactions between the target chemical and at least one of the active material 220, the conductive particles 224 and the insulating material 226. In some embodiments, two or more of the active material 220, the conductive particles 224, and the insulating material 226 may be selected to interact with the same target chemical to change the resistance of the QTC material 212 in the aggregate. By way of non-limiting example, the conductive particles 224 may be selected to react chemically with the target chemical to become non-conductive, and the insulating material 226 may be selected to swell responsive to contacting the target chemical. The interactions between the target chemical and both the conductive particles 224 and the insulating material 226 may tend to increase the electrical resistance of the QTC material 212. Thus, the target chemical may be detected by sensing an aggregate decrease in the electrical resistance of the QTC material 212.

In some embodiments, different ones of the active material 220, the conductive particles 224, and the insulating material 226 may be selected to interact with different target chemicals. For example, an active material 220 may be selected to interact with a first target chemical to decrease the electrical resistance of the QTC material 212, and an insulating material 226 may be selected to interact with a second target chemical to increase the electrical resistance of the QTC material 212. Accordingly, the first target chemical may be detected by sensing a decrease in electrical resistance of the QTC material 212, and the second target chemical may be detected by sensing an increase in electrical resistance of the QTC material 212.

Figure 4:
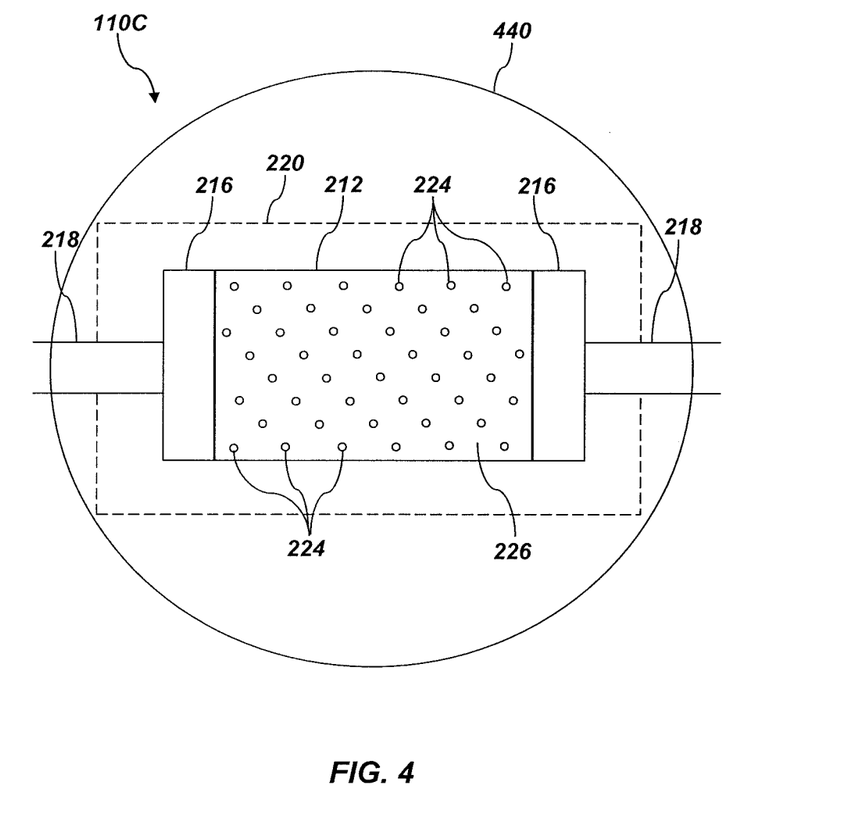
FIG. 4 is a simplified cross-sectional view of a portion of yet another sensor.

FIG. 4 is a simplified cross-sectional view of a portion of another sensor 110C. The sensor 110C may include any of the sensors 110A, 110B previously discussed with respect to FIGS. 2 and 3. Similar to the sensors 110A, 110B, the sensor 110C may include a QTC material 212 operably coupled between conductive electrodes 216. The QTC material 212 may include conductive particles 224 distributed in an electrically insulating material 226. Conductors 218 operably coupled to the conductive electrodes 216 may enable electrical communication between the QTC material 212 and the electrical resistance measuring circuitry 114 (FIG. 1B).

In some embodiments, the sensor 110C may include an active material 220 similar to the active material 220 discussed above with reference to FIG. 2. Accordingly, in some embodiments, the electrical resistance of the QTC material 212 may be configured to change at least in part responsive to interactions between the active material 220 and the target chemical. In some embodiments, the sensor 110C may not include the active material 220.

In some embodiments, the electrical resistance of the QTC material 212 may be configured to change at least in part responsive to interactions between the target chemical and one or both of the conductive particles 224 and the electrically insulating material 226, as discussed above with reference to FIG. 3.

The sensor 110C may also include a selectively permeable membrane 440 (hereinafter referred to simply as "membrane" 440) enclosing the QTC material 212. The membrane 440 may be configured to selectively allow certain fluids to permeate from outside the membrane 440 to the inside of the membrane 440. By allowing some, but not other fluids, to enter the membrane 440, the membrane 440 may enable the sensor 110C to detect a narrower set of target chemicals.

In some embodiments, the membrane 440 may be configured to only enable fluids (e.g., hydrocarbons) of targeted molecular weights to permeate the membrane 440. In some embodiments, the membrane 440 may be configured to only enable water-based fluids to permeate the membrane 440. In some embodiments, the membrane 440 may be configured to only enable oil-based fluids to permeate the membrane 440.

By way of non-limiting example, at least one of the active material 220, the conductive particles 224, and the insulating material 226 may be configured to interact with a broad set of hydrocarbons to change the electrical resistance of the QTC material 212. It may be desirable, however, to detect only a narrow subset of the broad set of hydrocarbons having specific molecular weights, and that are associated with the presence of oil in a wellbore 174 (FIG. 1). The membrane 440 may be configured to enable only the narrow subset of the broad set of hydrocarbons to permeate the membrane 440. Accordingly, the membrane 440 may enable the sensor 110C to detect the narrow subset of the broad set of hydrocarbons.

The different components of the sensor 110C (e.g., the active material 220, the insulating material 226, the conductive particles 224, and the membrane 440) may thus be selected to interact with the target chemical to change the electrical resistance of the QTC material 212 responsive to contact with the target chemical. The components of the sensor 110C may also be selected to enable the sensor 110C to detect specific properties of chemicals. By way of non-limiting example, the different components of the sensor 110C may be selected to interact with chemicals to determine whether the chemicals are acidic or basic. As a specific, non-limiting example, the material of the conductive particles 224 may be selected to interact with one of a base and an acid to reduce the conductivity of the conductive particles 224. The material of the conductive particles 224 may also be selected to not interact with the other of the base and the acid to reduce the conductivity of the conductive particles 224. The sensor 110C may then be capable of determining whether a chemical is basic or acidic.

Also by way of non-limiting example, the different components of the sensor 110C may be selected to interact with chemicals to determine whether the chemicals include water or oil. As a specific, non-limiting example, a membrane 440 may be selected to enable water to permeate the membrane 440, and prevent oil from permeating the membrane. The insulating material 226 may be selected to swell responsive to contact with water, thereby increasing the electrical resistance of the QTC material 212. If the sensor 110C contacts chemicals that include water, the water may permeate the membrane 440, and contact the insulating material 226. The electrical resistance of the QTC material 212 may increase, and the presence of the water in the chemicals may be detected by measuring the change in the electrical resistance of the QTC material 212.

Figure 5:
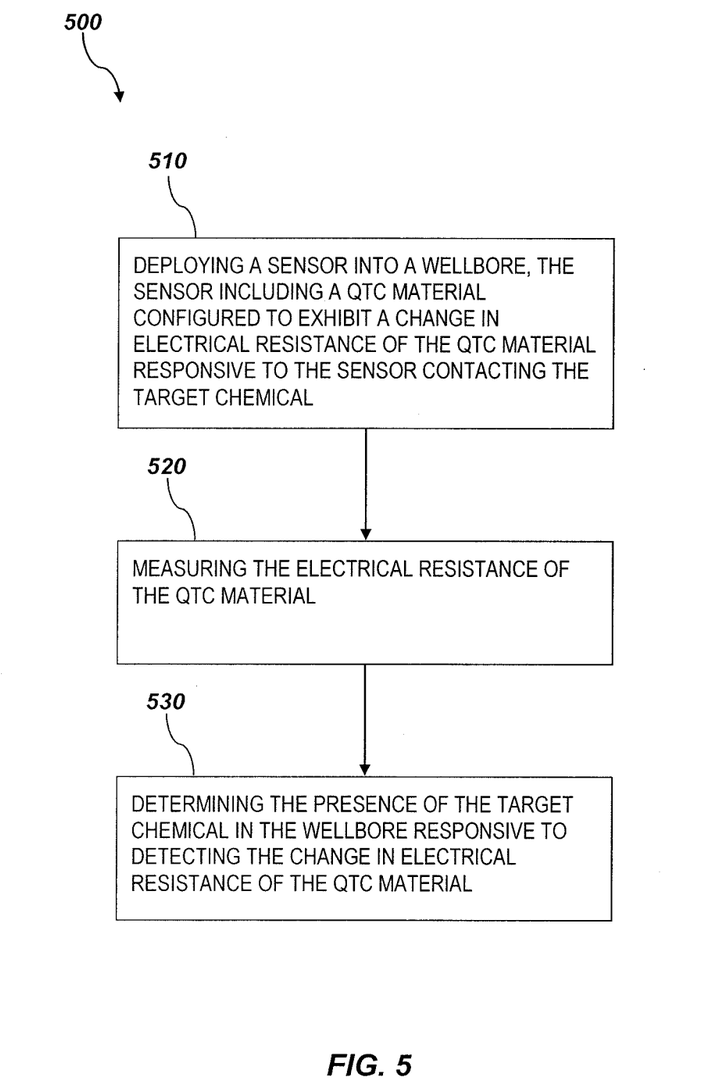
FIG. 5 is a simplified flowchart illustrating a method of sensing a target chemical.

FIG. 5 is a simplified flowchart 500 illustrating a method of sensing a target chemical. Referring to FIGS. 1A, 1B, and 5 together, at operation 510, the method may include deploying a sensor 110 into a wellbore 174. The sensor 110 may include a QTC material 212 configured to exhibit a change in an electrical resistance of the QTC material 212 responsive to the sensor 110 contacting a target chemical. In some embodiments, deploying the sensor 110 into the wellbore 174 may include deploying a drilling assembly including the sensor 110 into the wellbore 174. In some embodiments, deploying the sensor 110 into the wellbore 174 may include deploying a slickline, wireline or coiled tubing comprising the sensor 110 into the wellbore 174.

At operation 520, the method may comprise measuring the electrical resistance of the QTC material 212. In some embodiments, measuring the electrical resistance of the QTC material 212 may include drilling the wellbore 174 while measuring the electrical resistance of the QTC material 212.

At operation 530, the method may comprise determining the presence of the target chemical in the wellbore 174 responsive to detecting the change in the electrical resistance of the QTC material 212. In some embodiments, determining the presence of the target chemical in the wellbore 174 comprises receiving the sensor signal 128 with control circuitry 132 of the surface equipment 130 and detecting the change in the electrical resistance with the control circuitry 132. In some embodiments, determining the presence of the target chemical in the wellbore 174 may include comparing a measured electrical resistance of the QTC material 212 to an expected electrical resistance of the QTC material 212 under applied hydrostatic wellbore pressure to detect deviation of the measured electrical resistance from the expected electrical resistance.

Figure 6:
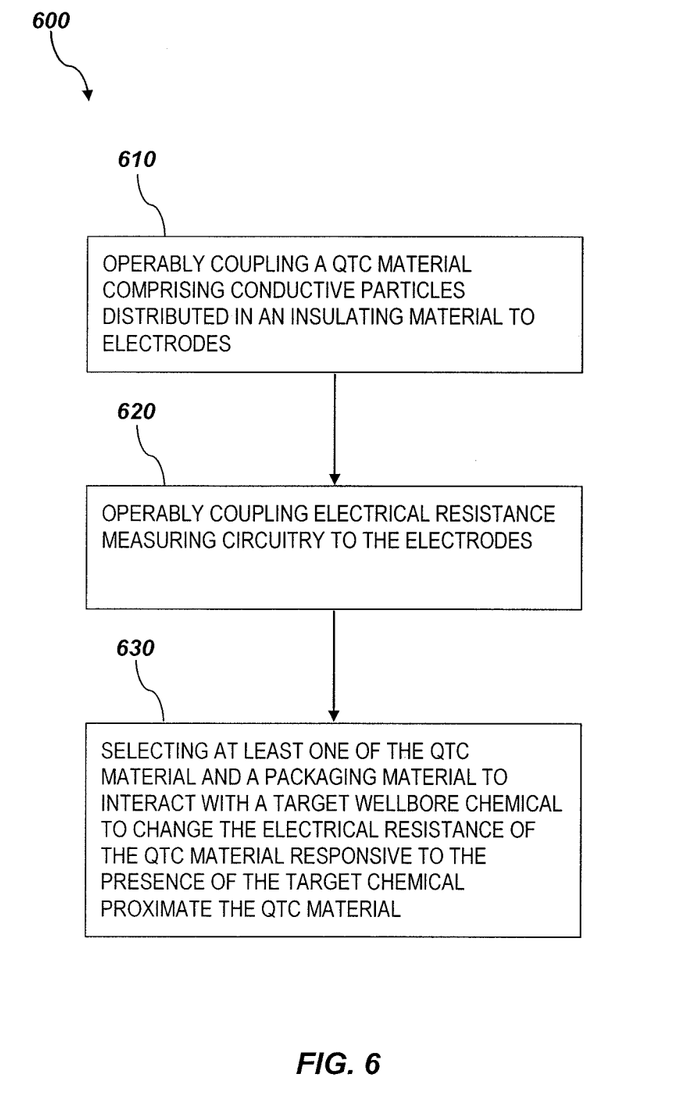
FIG. 6 is a simplified flowchart illustrating a method of manufacturing a device configured for use in a wellbore.

FIG. 6 is a simplified flowchart 600 illustrating a method of manufacturing a device configured for use in a wellbore 174 (FIG. 1A). At operation 610, the method may include operably coupling a QTC material 212 comprising conductive particles 224 distributed in an insulating material 226 to conductive electrodes 216 (FIGS. 2 through 4). In some embodiments, operably coupling the QTC material 212 to the conductive electrodes 216 may include operably coupling the conductive electrodes 216 to opposing sides of the QTC material 212.

At operation 620, the method may include operably coupling electrical resistance measuring circuitry 114 (FIG. 1B) to the conductive electrodes 216. In some embodiments, operably coupling the electrical resistance measuring circuitry 114 to the conductive electrodes 216 may include operably coupling conductors 218 (FIGS. 2 through 4) between the conductive electrodes 216 and the electrical resistance measuring circuitry 114.

At operation 630, the method may include selecting at least one of the QTC material 212 and an active material 220 (FIGS. 2 and 4) at least partially surrounding the QTC material 212 to interact with a target wellbore chemical to change the electrical resistance of the QTC material 212 responsive to the presence of a target chemical proximate the QTC material 212. In some embodiments, selecting at least one of the QTC material 212 and the active material 220 to interact with the target wellbore chemical includes selecting the conductive particles 224 of the QTC material 212 to chemically react with the target wellbore chemical to reduce the electrical resistance of the QTC material 212. In some embodiments, selecting at least one of the QTC material 212 and the active material 220 to interact with the target wellbore chemical to change the electrical resistance of the QTC material comprises selecting the active material 220 to contract on the QTC material 212 responsive to the presence of the target wellbore chemical proximate the QTC material 212.

Figure 7:
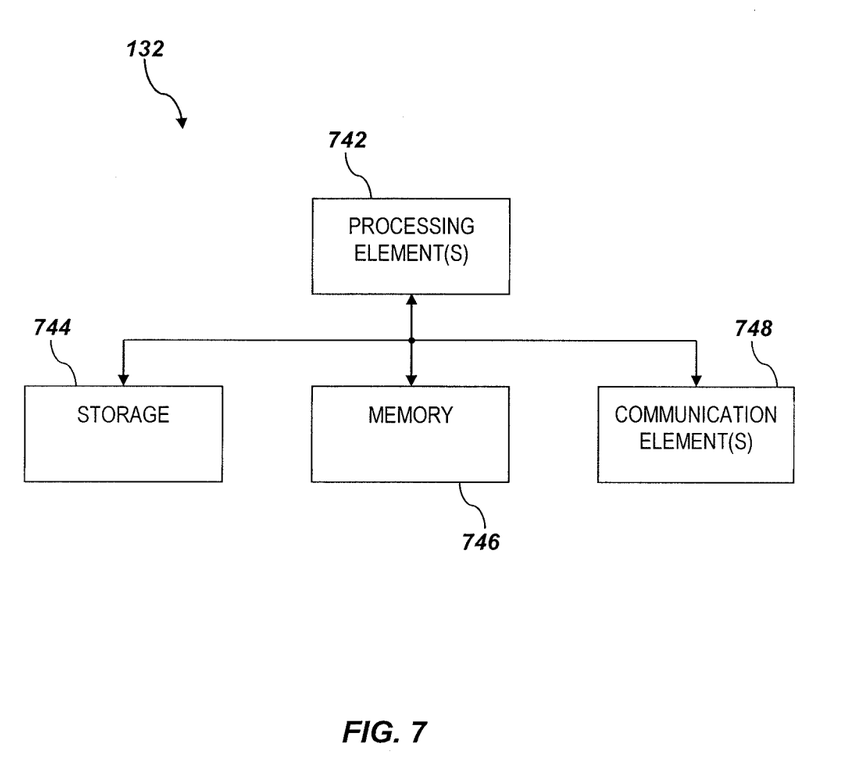
FIG. 7 is a simplified block diagram of a non-limiting example of control circuitry of the chemical sensing system of FIG. 1B.

FIG. 7 is a simplified block diagram of a non-limiting example of the control circuitry 132 of the surface equipment 130 of FIG. 1B. The control circuitry 132 may be configured for executing software programs containing computing instructions and may include one or more processing elements 742 (sometimes referred to herein as "processing elements" 742), storage 744, memory 746, and one or more communication elements 748 (sometimes referred to herein as "communication elements" 748).

As non-limiting examples, the control circuitry 132 includes a user-type computer, a file server, a computer server, a notebook computer, a tablet, a handheld device, a mobile device, or other similar computer system for executing software.

The processing elements 742 may be configured for executing a wide variety of operating systems and applications including the computing instructions for carrying out embodiments of the present disclosure. By way of non-limiting example, the processing elements 742 may be configured for executing computing instructions for determining the presence of the target chemical in the wellbore 174 using the sensor information from the sensor signal 128 (FIGS. 1A and 1B).

The memory 746 may be used to hold computing instructions, data, and other information for performing a wide variety of tasks including performing embodiments of the present disclosure. By way of example, and not limitation, the memory 746 may include Synchronous Random Access Memory (SRAM), Dynamic RAM (DRAM), Read-Only Memory (ROM), Flash memory, and the like.

The communication elements 748 may be configured for communicating with other devices or communication networks. As non-limiting examples, the communication elements 748 may include elements for communicating on wired and wireless communication media, such as, for example, serial ports, parallel ports, Ethernet connections, universal serial bus (USB) connections, IEEE 1394 ("firewire") connections, BLUETOOTH® wireless connections, 802.1 a/b/g/n type wireless connections, and other suitable communication interfaces and protocols. The communication elements 748 may specifically be configured to enable the processing elements 742 to receive the sensor signals 128 from the sensor 110 and to interface with the deployment equipment 134 (FIG. 1B). In some embodiments, the communication elements 748 may also be enabled to communicate with an off-site computing device (not shown) to enable a user to control the deployment equipment 134 and receive sensor information at an off-site location.

The storage 744 may be used for storing relatively large amounts of non-volatile information for use in the control circuitry 132 and may be configured as one or more storage devices. By way of example, and not limitation, these storage devices may include computer readable media (CRM). This CRM may include, but is not limited to, magnetic and optical storage devices such as disk drives, magnetic tapes, CDs (compact discs), DVDs (digital versatile discs or digital video discs), and other equivalent storage devices. By way of non-limiting example, sensor data measured over time may be stored in the storage 744. Also by way of non-limiting example, depth data indicating the depth of the sensor 110 in the wellbore 174 when the sensor data was measured may also be stored in the storage 744.

By way of non-limiting example, computing instructions for carrying out embodiments of the present disclosure may be stored on the storage 744, transferred to the memory 746 for execution, and executed by the processing elements 742. The processing elements 742, when executing computing instructions, constitute structure for carrying out embodiments of the present disclosure, and can be considered a special-purpose computer when so configured.

Embodiments of the present disclosure may enable chemical detection in a wellbore 174 without removing samples (e.g., mud, rocks, etc.) from the wellbore, and without sending the samples to a laboratory for testing. If used while drilling in combination with suitable communication equipment for transmitting sensor signals to the surface, embodiments of the present disclosure may enable chemical detection in the wellbore without removing a drilling apparatus from the wellbore, and without halting the drilling, thereby saving time and money.

Also, sensors 110, 110A, 110B, and 110C (FIGS. 1A through 4), may be relatively inexpensive to manufacture, and have a relatively small physical size compared to conventional wellbore monitoring devices. Furthermore, the QTC materials 212 of the sensors 110, 110A, 110B, and 110C may be compatible with the harsh environmental chemistry, pressure, and temperatures encountered in wellbore environments.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure.

What is claimed is:

1. A device configured for use in a wellbore, comprising:
   a body; and
   a sensor carried by the body, the sensor including:
      a quantum tunneling composite material comprising conductive particles dispersed in an insulating material, the quantum tunneling composite material configured to exhibit a change in an electrical resistance responsive to the quantum tunneling composite material contacting at least one of a first set of target wellbore chemicals in a wellbore;
      an active material disposed on and at least partially enclosing the quantum tunneling composite material, the active material configured to exhibit a change in volume responsive to the active material contacting at least one of the first set of target wellbore chemicals in the wellbore; and
      a selectively permeable membrane at least partially enclosing the quantum tunneling composite material, the selectively permeable membrane having an exterior surface and an opposite, interior surface facing the quantum tunneling composite material, the selectively permeable membrane configured to enable the first set of target wellbore chemicals to permeate the selectively permeable membrane such that the first set of target wellbore chemical passes from the exterior surface to the interior surface to contact at least one of the quantum tunneling composite material or the active material and to prevent a second set of target wellbore chemicals from permeating the selectively permeable membrane such that the second set of target wellbore chemicals does not pass from the exterior surface to the interior surface; and
   electrical resistance measuring circuitry operably coupled to the quantum tunneling composite material and configured to measure the electrical resistance of the quantum tunneling composite material and output a sensor signal indicating the electrical resistance.

2. The device of claim 1, wherein the selectively permeable membrane is configured to enable water-based fluids to permeate the membrane and to prevent oil-based fluids from permeating the membrane.

3. The device of claim 1, wherein the selectively permeable membrane is configured to enable oil-based fluids to permeate the membrane and to prevent water-based fluids from permeating the membrane.

4. The device of claim 1, wherein the selectively permeable membrane is configured to enable hydrocarbons associated with at least one of oil and natural gas associated with the first set of target wellbore chemicals to pass permeate the membrane and to prevent other hydrocarbons associated with the second set of target wellbore chemicals from permeating the membrane.

5. The device of claim 1, wherein the conductive particles dispersed in an insulating matrix comprises nickel particles dispersed in a silicon elastomer matrix.

6. The device of claim 1, wherein the quantum tunneling composite material comprises conductive particles distributed in at least one insulating material selected from the group consisting of perfluoroelastomer (FFKM), nitrile, hydrogenated nitrile butadiene rubber (HNBR), fluoroelastomer (FKM), base resistant fluoroelastomer (FEPM), ethylene propylene diene monomer (EPDM), polyurethane, polytetrafluoroethylene, polyetheretherketone (PEEK), polyphenylene sulfide, epoxy, phenolic carbon fiber, and poly-oxydiphenylene-pyromellitimide.

7. The device of claim 1, further comprising deployment equipment configured to deploy and retract the body into a wellbore, the deployment equipment comprising at least one device selected from the group consisting of a wireline, a drilling assembly, equipment used for completion of a wellbore, and equipment used for production of a wellbore.

8. The device of claim 1, wherein the active material is configured to one of apply pressure to and relieve pressure from the quantum tunneling composite material responsive to the active material contacting at least one of the first set of target wellbore chemicals.

9. The device of claim 1, wherein the active material is configured to separately detect hydrocarbons associated with at least one of oil and natural gas and water.

10. The device of claim 1, wherein the active material comprises zinc oxide (ZnO) or tin oxide ($SnO_2$), and wherein the active material is configured to contract and apply pressure to the quantum tunneling composite material responsive to the active material contacting hydrogen sulfide ($H_2S$).

11. The device of claim 1, wherein the active material comprises an ion-selective polymer or an ionophore-doped sensing membrane.

12. The device of claim 1, wherein the active material comprises a polymeric material selected from the group consisting of NAFION, poly vinyl chloride (PVC) with crown ethers, tridodecylmethylammonium-dinonylnapthalene sulfonate (TDMA-DNNS), PVC with bis(2-ethylhexyl) sebacate (DOS, non-polar), and PVC with ortho-nitrophenyl octylether (o-NPOE, polar).

13. The device of claim 1, wherein the active material is configured to apply pressure to and relieve pressure from the quantum tunneling composite material responsive to the active material contacting at least one of the first set of target wellbore chemicals.

14. The device of claim 1, wherein one of the conductive particles and the insulating material of the quantum tunneling composite material is configured to interact with at least one of the first set of target wellbore chemicals.

15. The device of claim 14, wherein the insulating material is configured to one of swell and contract responsive to the quantum tunneling composite material contacting at least one of the first set of target wellbore chemicals.

16. The device of claim 14, wherein the conductive particles of the quantum tunneling composite material are configured to react with at least one of the first set of target wellbore chemicals to become less conductive responsive to the quantum composite tunneling material contacting the first set of target wellbore chemicals.

17. The device of claim 16, wherein the conductive particles comprise silver particles, and wherein the silver particles are configured to become less conductive response to contact with hydrogen sulfide ($H_2S$).

18. A sensor configured for use in a wellbore, comprising:
an active material disposed on and at least partially enclosing a quantum tunneling composite material, the quantum tunneling composite material comprising conductive particles dispersed in an insulating material, wherein the active material is configured to exhibit a change in volume responsive to the active material contacting a target wellbore chemical, wherein the quantum tunneling composite material is configured to exhibit a change in electrical resistance responsive to the change in volume; and
electrical resistance measuring circuitry operably coupled to the quantum tunneling composite material and configured to measure the electrical resistance of the quantum tunneling composite material and output a sensor signal indicating the electrical resistance.

19. The sensor of claim 18, wherein the quantum tunneling composite material is configured to exhibit a change in volume responsive to the active material contacting the target wellbore chemical.

20. The sensor of claim 18, wherein each of the active material, the conductive particles, and the insulating material interacts with a different target wellbore chemical.

* * * * *

UNITED STATES PATENT AND TRADEMARK OFFICE
CERTIFICATE OF CORRECTION

PATENT NO. : 10,401,527 B2
APPLICATION NO. : 15/854925
DATED : September 3, 2019
INVENTOR(S) : Othon R. Monteiro, Anusha Chilukuri and Sankaran Murugesan Page 1 of 1

It is certified that error appears in the above-identified patent and that said Letters Patent is hereby corrected as shown below:

In the Claims
Claim 4, Column 14, Line 40, change "to pass permeate the" to --to permeate the--

Signed and Sealed this
Twelfth Day of November, 2019

Andrei Iancu
*Director of the United States Patent and Trademark Office*